Oct. 14, 1969 — A. T. STEVENS — 3,472,221

METHOD FOR MANUFACTURING A MELTING GRID AND THE MELTING GRID MANUFACTURED THEREBY

Filed March 13, 1967

INVENTOR
ANTONIUS THEODORUS STEVENS

Oct. 14, 1969     A. T. STEVENS     3,472,221
METHOD FOR MANUFACTURING A MELTING GRID AND THE MELTING
GRID MANUFACTURED THEREBY
Filed March 13, 1967     2 Sheets-Sheet 2
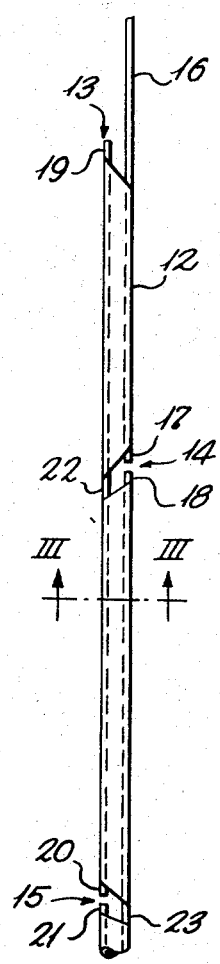
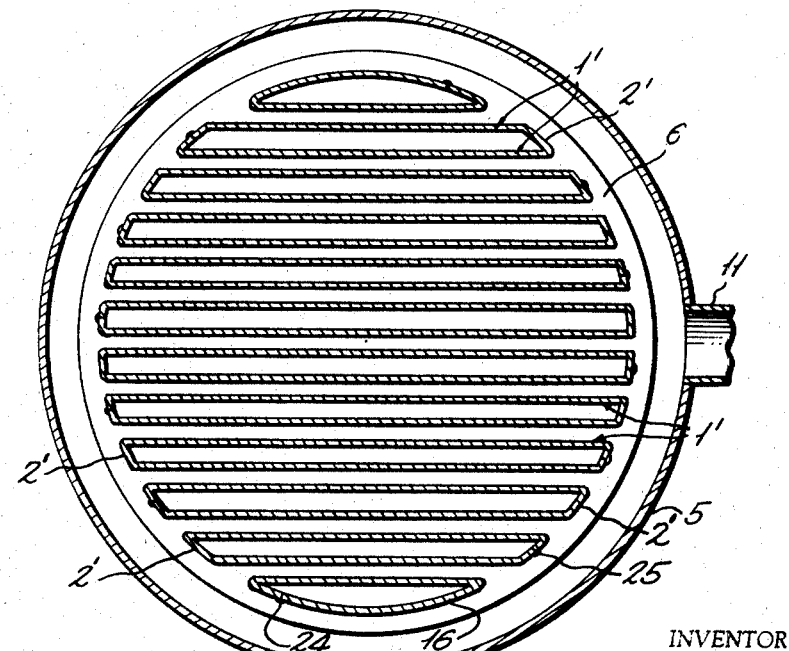
INVENTOR
ANTONIUS THEODORUS STEVENS United States Patent Office 3,472,221
Patented Oct. 14, 1969

3,472,221
METHOD FOR MANUFACTURING A MELTING GRID AND THE MELTING GRID MANUFACTURED THEREBY
Antonius T. Stevens, Ede, Gelderland, Netherlands, assignor to American Enka Corporation, Enka, N.C., a corporation of Delaware
Filed Mar. 13, 1967, Ser. No. 622,805
Claims priority, application Netherlands, Mar. 15, 1966, 6603317
Int. Cl. F23h *13/00*
U.S. Cl. 126—152       6 Claims

ABSTRACT OF THE DISCLOSURE

A method for manufacturing a melting grid having a plurality of parallel hollow grid bars mounted in an inner wall of an annular chamber in which a single continuous tubular member having a pair of separate wall-forming sections at each end and pairs of separate wall-forming sections on alternately opposite sides at spaced intervals along its length is bent zigzag-wise adjacent to the spaced wall-forming section to form a system of interconnected parallel hollow grid bars, the separate wall-forming sections are joined together to form a continuous inner wall for the annular chamber and thereafter the continuous inner wall is connected to the upper and lower boundary walls for the annular chamber to provide fluid tight connections between the grid bars and the annular chamber and the construction of the melting grid manufactured thereby.

---

This invention relates to a unique method for manufacturing a grid to be used for melting thermoplastic materials comprising an annular chamber and a plurality of parallel hollow grid bars which are at both ends mounted in the inner wall of the annular chamber. This invention also relates to the melting grids manufactured by this method.

Melting grids of the type indicated above are known and are widely used in the melt spinning of filaments, threads and yarns from thermoplastic materials. Thermoplastic materials that are suitable to be processed by melt spinning are, for instance, polyamides, polyesters, cellulose acetate and the like.

In the melt spinning process a granular mass of a thermoplastic material is placed on a melting grid, and after the material has melted, it is pumped to a spinneret plate through which it is extruded in the form of filaments. The melting grids may be heated electrically, but as a rule the grids are heated by a heating fluid. The heating fluid circulates through the annular chamber and through the hollow grid bars. It will be understood that the term "fluid" includes liquid media and also vapors that condense against the walls of the annular chamber and the hollow grid bars. A widely used heating medium consists of an eutectic mixture of diphenyl and diphenyl oxide, which is commercially available under the trade name Dowtherm.

In the manufacture of known melting grids the following porcedure has been used: A tube is cut into pieces having the lengths of the desired grid bars. Then the ends of the bars are placed in holes provided in the inner wall of the annular chamber. At these positions each of the bars were secured by welding. For a proper fluid tight connection between the bars and the annular chamber it was often found necessary to provide welds both on the "polymer side" of the inner wall and on the interior side of the annular chamber. One advantage of this construction is that the presence of the welds on the "polymer side" of the inner wall cause the sharp corners between the grid bars and the inner wall to be rounded off, so that the formation of dead corners in the polymer stream can be reduced.

It will be understood that it is particularly advantageous to construct the melting grids so that a highly uniform polymer flow is obtained through the grids. Nonuniform polymer flow through the grid leads to differences in residence time among portions of the thermoplastic material. As a consequence in the molten state, many of the polymeric thermoplastic materials may have a strongly variable composition.

In general, if the molten material is kept in the liquid state for a relatively long time, it will decrease in quality. Therefore, it is particularly desirable to construct the melting grids so that portions of the spinning material will not have a relatively long residence time in dead corners of the grid.

Dead corners may also be formed by the welds used in the construction of the grid. This is particularly the case if the welds are rough, or if they show cavities. Therefore, in carrying out the conventional methods of manufacturing melting grids, grinding and polishing of the welds on the polymer side of the grid bars and on the inner wall of the annular chamber are done with the utmost care. The grinding and polishing have in fact been found to be the most expensive operations in the manufacture of melting grids. For the purpose of illustration it should be noted that, depending on the quality of the welds, grinding and polishing often takes from 30 to 60 man-hours per grid.

Advantageously the present invention provides an inexpensive, simpler and less elaborate method for the manufacture of melting grids. Moreover, the method of the invention reduces the grinding and polishing of welds to a minimum.

Thus, this invention contemplates a method for manufacturing a melting grid having a plurality of parallel hollow grid bars mounted in the inner wall of an annular chamber in which a single continuous tubular member having a pair of separate wall-forming sections at each end and pairs of separate wall-forming sections on alternately opposite sides at spaced intervals along its length is bent zigzag-wise adjacent to the spaced wall-forming sections to form a system of interconnected parallel hollow grid bars, the separate wall-forming sections are joined together to form a continuous inner wall for the annular chamber and thereafter the continuous inner wall is connected to the upper and lower boundary walls for the annular chamber.

More particularly, in accordance with this invention the continuous tubular member is provided with a pair of lips of unequal length at each end and is locally and on alternately opposite sides along its length at spaced intervals provided with recesses, each of which extend over more than half of the circumference of the tubular member to form a pair of lips positioned opposite the remaining connecting portion of the tubular member, the lips having the same width as the connecting portion. The tubular member is bent zigzag-wise at the connecting portions to form the system of parallel grid bars joined together by the connecting portions and the lips are bent in opposite directions and are subsequently connected to form the continuous inner wall for the annular chamber. In this manner it has been found possible to connect or join the lips by welds from the interior side of the annular chamber to be formed. Consequently, there is no need for the presence of any welds on the "polymer side" of the grid. Furthermore, because the transition from the grid bars to the inner wall of the annular chamber (i.e., the connections therebetween) are obtained by bending portions of the tubular member itself, these transitions will be adequately curved to avoid dead spots on the "polymer side" in the construction of the grid.

A very important advantage of the novel method of this invention is that the polishing of the grid bars and the inner wall may now be carried out before the lips are welded and preferably before bending. Thus, it is possible to polish the tubular member when it is still straight, which gives practically no difficulties and which can be done very rapidly. As a result, the very long grinding and polishing times of the conventional method are no longer required.

Another advantage of this method is that as a result of reduced amount of welding with much shorter welding seams, the chance for hard-to-repair leaks is considerably reduced.

It will be understood that with the known method the grid bars had to be interspaced at intervals of at least eight millimeters because of the thickness of the welding electrodes and the diameter of the grinding wheels. The present method makes it possible for the grid bars to be spaced at smaller intervals. Consequently, although the same over-all dimensions of the grid may be maintained, the heated surface area may be increased. It will be recognized that bending the grid bars is found to be particularly attractive mode of fabrication in the case of melting grids having rectangular cross-sections.

This invention also contemplates a melting grid comprising a plurality of parallel hollow grid bars mounted in both ends in an annular chamber, in which the grid bars and the inner wall of the annular chamber are formed from a single continuous tubular member and attached to the upper and lower boundary walls of the annular chamber as set forth above in the method of the invention.

The invention will be further described with reference to the accompanying drawings in which:

FIGURE 3 is a cross section taken along line III—III on FIGURE 4;

FIGURE 4 is a longitudinal view of a portion of a tubular member used to form grid bars of the invention;

FIGURE 5 is a plan view of the tubular member shown in FIGURE 4 after it has been formed into grid bars of the invention; and FIGURE 6 is a cross section taken along line VI—VI of FIGURE 1b showing the grid arrangement of the melting grid of the invention.

In the drawings the elements used in the construction of the conventional melting grid and in the construction of the melting grid of the invention which are identical are referred to by the same reference numerals.

Figure 1A:
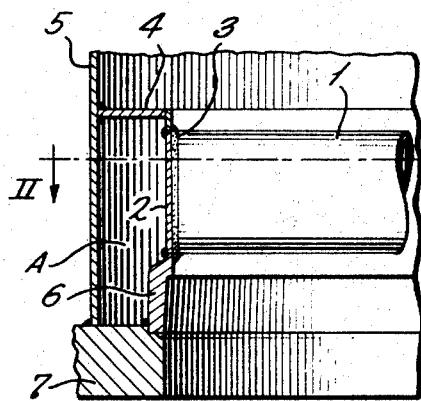
FIGURE 1a is a fragmentary view showing the construction of a conventional melting grid in a longitudinal section.
Figure 1B:
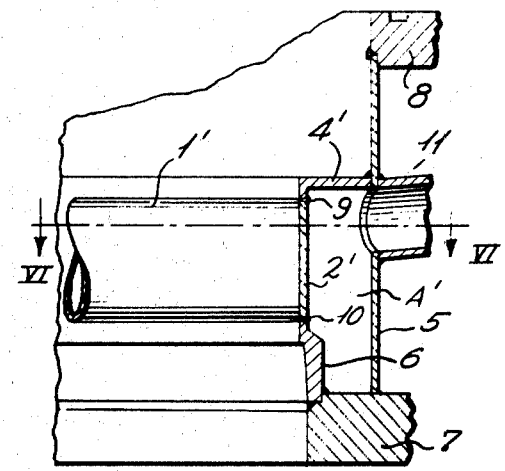
FIGURE 1b is a fragmentary view showing the construction of a melting grid according to the invention in a longitudinal section.

As shown in FIGURES 1a and 1b the conventional melting grid and the melting grid of the invention each have plurality of hollow grid bars connected at their ends to an annular chamber through which a heated fluid is circulated.

In FIGURE 1a the reference numeral 1 refers to the hollow grid bars of a conventional melting grid and in FIGURE 1b reference numeral 1' refers to the grid bars of the melting grid of the invention. Each of the bars 1 and 1' are connected at their ends to the inner walls of the annular chamber A and A', respectively.

The annular chamber A of the conventional melting grid has an upper boundary or wall formed by the ring-like plate 4, an outer wall formed by the cylindrical casing or shell 5, a lower boundary or wall formed by the annular flange 7 and an inner wall made up of the lower cylindrical ring 6 and the upper cylindrical ring 2. The flange 7 also serves to attach the lower end of melting grid to a spinning machine. Another flange (not shown) is attached to the top of the shell 5 and provides means for attaching the melting grid to a feed conduit for spinning granules.

The upper boundary or wall, the outer wall, and the lower boundary or wall of the annular chamber A' of the melting grid of the invention is likewise formed by plate 4', casing 5 and flange 7, respectively. As shown in FIGURE 1b, the lower portion of the inner wall of the melting grid of the invention is also made up of a ring 6. The upper portion of the inner wall is made up of a plurality of wall-forming sections 2', which as hereinafter described in greater detail, are parts of the tubular member 12 used to form the grid bars 1'.

The melting of the invention is also provided with an upper flange 8 that is identical to the one used by the conventional melting grid which serves to attach the grid to a feed conduit for the spinning granules.

Figure 2:
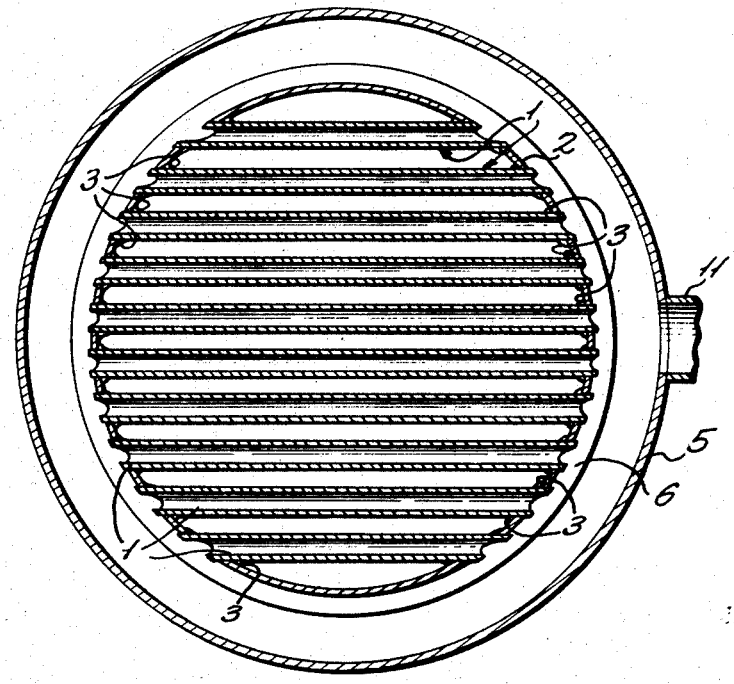
FIGURE 2 is a cross section taken along line II—II on FIGURE 1a showing the grid arrangement of the conventional melting grid.

It will be understood that FIGURE 1a together with FIGURE 2 illustrates the melting grid constructed by a conventional method; whereas, FIGURE 1b together with FIGURE 6 illustrate the melting grid made by the method of this invention.

As can be seen from FIGURE 1a and FIGURE 2 the grid bars 1 are mounted in recesses on the upper portion of the inner wall formed by ring 2 and are secured thereto by welds 3. These welds extend around the grid bars on the polymer side of the grid, i.e., on the side over which thermoplastic polymer flows during the melting operation.

FIGURE 3 shows a cross-section of the tubular member 12 from which the hollow grid bars of the melting grid of the invention are made. As hereinafter described in greater detail, the cross-section of each of the hollow grid bars 1' which extend across the melting grid is the same as the cross-section of the tubular member 12.

The manufacture of the grid bars of the invention will be better understood from an inspection of FIGURE 4 which shows a portion of the tubular member 12. In its entirety the tubular member has a length which is greater than the total length of all the grid bars 1' together. It will be understood that only the left end portion of the tubular member is shown.

One successive sections of the tubular member, recesses or cut-out portions 13, 14 and 15 are provided. These recesses are formed locally by cutting open the sides of the tubular member having the greatest curvature and by slitting adjacent portions of the tubular member along the sides having the slightest curvature. In this way, as can be seen from FIGURE 4, two lips 16 and 19 of unequal length are formed at the left hand end portion of tubular member 12. At the recess 14 two lips 17 and 18 are formed on the one side of the member 12 and a connecting piece or portion 22 on the other side. Likewise, two lips 20 and 21 and a connecting piece 23 are formed on the other side of the member at the recess 15. All the following recesses are formed in a corresponding manner, with the right-hand end of the tubular member being provided with lips similar to lips 16 and 19.

FIGURE 5 shows how the tubular member 12 is subsequently bent zigzag-wise and connected by welds to form an integral grid unit. The ends of the bent lips 16 and 17 are placed in contact along their edges and are joined by a weld 24. Likewise, the lips 19 and 20 are joined by a weld 25. The remaining lips are bent and welded together in a corresponding manner to form the complete grid unit.

FIGURE 6 shows the complete melting grid obtained by securing the integral grid unit into place. The grid bars 1' and the upper portion of the inner wall (as also shown in FIGURE 1b) are thus formed from the tubular member 12. The upper portion of the inner wall (made up of the wall-forming sections 2' which are provided by the lips and connecting pieces of the tubular member 12) and remaining end portions of the grid bars are attached to the ring 4' and to the ring 6 by means of the welds 9 and 10. In this manner the grid bars are joined to the annular chamber with fluid tight connections. Rings 4' and 6 are attached, respectively, to the outer wall 5 and the flange 7, as in the construction of the conventional melting grid. Also as in the conventional melting grid heating fluid is supplied to the annular chamber through the fluid inlet 11 and conventional bleed-off means or the like (not shown) are provided to insure circulation of the fluid through the grid bars and the annular chamber.

Installation of the melting grid in the spinning apparatus is not shown in the drawing because such installation does not form part of the invention and because it is carried out in the same way as is the case with the known melting grids.

It will be appreciated that the particular configuration and location of the recesses or cut-out portions spaced along the tubular member are, in part, dependent on the final cross-sectional shape of the grid unit, that is, circular (as shown), oval, rectangular, or the like.

Furthermore, it will be appreciated that inner wall of the annular chamber may be made entirely from the wall-forming sections of the tubular member or in part as shown in the accompanying drawings.

While the novel features of the invention have been shown and described and are pointed out in the appended claims, it is to be understood that various omissions, modifications and substitutions in the features shown and described may be made by those skilled in the art without departing from the spirit and scope of the invention.

What is claimed is:

1. A method for manufacturing a grid for melting thermoplastic materials having a plurality of parallel hollow grid bars mounted in an inner wall of an annular chamber which comprises bending a single continuous tubular member having a pair of separate wall-forming sections at each end and pairs of separate wall-forming sections on alternately opposite sides at spaced intervals along its length, zigzag-wise adjacent to the spaced wall-forming sections to form a system of interconnected parallel hollow grid bars, joining the separate wall-forming sections to form a continuous inner wall for the annular chamber and thereafter connecting the continuous inner wall to the upper and to the lower boundary walls for the annular chamber to provide fluid tight connections between the grid bars and the annular chamber.

2. The method of claim 1 in which the separate wall-forming sections at each end of the tubular member comprise a pair of lips of unequal length, said lips being formed from the sides of said member, and the spaced wall-forming sections comprise other pairs of lips formed by recesses positioned on alternately opposite sides along the length of said tubular member, each of said recesses extending over more than half of the circumference of the tubular member whereby each of the other pairs of lips are positioned opposite a remaining connecting portion of the tubular member, said lips having the same width as the connecting portion.

3. The method of claim 2 in which said lips are connected by welds made from the interior side of the annular chamber to be formed.

4. The method of claim 2 in which said tubular member is polished before said lips are connected together by welding.

5. The method of claim 2 in which said tubular member is polished before being bent zigzag-wise.

6. A grid for melting thermoplastic materials which comprises a plurality of parallel hollow grid bars mounted at both ends in an inner wall of an annular chamber, said grid bars being formed by bending a single continuous tubular member having a pair of separate wall-forming sections at each end and pairs of separate wall-forming sections on alternately opposite sides at spaced intervals along its length, zigzag-wise adjacent to the spaced wall-forming sections, and the inner wall being formed by joining the separate wall-forming sections together, said inner wall being connected to the upper and lower boundary walls of the annular chamber whereby fluid tight connections are provided between the ends of the grid bars and the annular chamber.

References Cited

UNITED STATES PATENTS

| | | | |
|---|---|---|---|
| 1,485,443 | 3/1924 | Torbensen | 29—475 X |
| 2,877,540 | 3/1959 | Austen | 29—604 |
| 3,041,048 | 6/1962 | Heijnis | 126—343.5 X |
| 3,144,864 | 8/1964 | Heijnis | 126—343.5 |
| 3,368,617 | 2/1968 | Rosman et al. | 29—157.3 X |

JOHN F. CAMPBELL, Primary Examiner

D. C. REILEY, Assistant Examiner

U.S. Cl. X.R.

29—157.3, 475; 126—343.5